US005561420A

United States Patent [19]

Kleefeldt et al.

[11] Patent Number: 5,561,420

[45] Date of Patent: Oct. 1, 1996

[54] MOTOR-VEHICLE CENTRAL LOCK SYSTEM WITH TRANSPONDER IN KEY

[75] Inventors: Frank Kleefeldt, Heiligenhaus; Peter Bartel, Hattingen; Willfried Ostermann, Essen; Fred Welskopf, Bochum, all of Germany

[73] Assignee: Kiekert Aktiengesellschaft, Heiligenhaus, Germany

[21] Appl. No.: 457,730

[22] Filed: Jun. 1, 1995

[30] Foreign Application Priority Data

Aug. 16, 1994 [DE] Germany .............................. 44 28 947

[51] Int. Cl.[6] .............................................. G06F 7/04

[52] U.S. Cl. ................................ 340/825.31; 340/825.54; 70/256; 307/10.5

[58] Field of Search ......................... 340/825.31, 825.34, 340/825.32, 825.54, 825.69, 825.72, 426, 572; 307/10.2, 10.3, 10.5; 180/287; 70/278, 256, 257

[56] References Cited

U.S. PATENT DOCUMENTS

| | | | |
|---|---|---|---|
| 4,471,343 | 9/1984 | Lemelson | 340/825.31 |
| 4,818,855 | 4/1989 | Mongeon et al. | 340/825.54 |
| 4,825,210 | 4/1989 | Bachhuber et al. | 340/825.31 |
| 4,837,567 | 6/1989 | Kleefeldt . | |
| 4,928,098 | 5/1990 | Dannhaeuser | 340/825.89 |
| 5,365,225 | 11/1994 | Bachhuber | 340/825.31 |
| 5,365,235 | 11/1994 | Kennedy et al. | 340/825.54 |
| 5,477,214 | 12/1995 | Bartel | 340/825.31 |

*Primary Examiner*—Michael Horabik
*Assistant Examiner*—Edwin C. Holloway, III
*Attorney, Agent, or Firm*—Herbert Dubno; Andrew Wilford

[57] ABSTRACT

A motor-vehicle lock system has a remote operator separate from the motor vehicle and having a key part having a predetermined bitting, a transmitter actuatable to transmit a main signal containing a main code word, and a transponder independent of the transmitter for receiving an interrogation signal and thereupon generating a callback signal containing a callback code word. A lock provided with a switch is actuatable mechanically by the key part to operate the switch. A receiver in the motor vehicle connected to a central lock controller receives the main signal including the main code word, extracts the main code word from the transmitted main signal, compares the extracted main code word with a predetermined main code word, and sends a release signal to the controller when the extracted main code word corresponds to the predetermined main code word to actuate the elements. A transceiver in the motor vehicle at the one lock is connected to the controller for, when the switch is actuated, generating the interrogation signal, receiving the callback signal containing the callback code word, extracting the callback code word from the callback signal, comparing the extracted callback code word with a predetermined callback code word, and sending a release signal to the controller when the extracted callback code word corresponds to the predetermined callback code word to actuate the elements.

7 Claims, 3 Drawing Sheets

MOTOR-VEHICLE CENTRAL LOCK SYSTEM WITH TRANSPONDER IN KEY

SPECIFICATION

1. Field of the Invention

The present invention relates to a high-security remotely operable motor-vehicle lock system. More particularly this invention concerns a central lock system operable by a key.

2. Background of the Invention

A standard remote-control lock system for a motor vehicle comprises a transmitter normally carried by the vehicle operator, a receiver in the vehicle, and a control circuit connected between the receiver and the actuators of the latches for the doors, and normally also the hood and trunk, of the vehicle. The transmitter itself comprises a code-word generator that produces a changing code word formed of a plurality of normally binary or digital code bits, a modulator that applies the current code word to a signal, and an output unit that takes the modulated signal and actually transmits it. The receiver has an intake unit that picks up the transmitted modulated signal, a demodulator that extracts any code word from it, and a release unit that compares the extracted code word with a stored correct code word and that actuates the various latches when the received and stored code word correspond to each other. The signal can be transmitted as a radio (normally UHF) wave, a light (normally infrared) beam, or even a sound (normally ultrasonic) wave so that there is no need for direct contact between the transmitter key and the receiver, just normally a line-of-sight proximity.

In order to prevent the code word from being picked up by a scanner who can subsequently reproduce it to gain entry to the vehicle, it has been suggested in U.S. Pat. No. 4,596,985 to provide for a changing code. To this end both the transmitter and receiver hold a predetermined number of code words in a predetermined sequence. Each time one of them is transmitted and received, both the transmitter and receiver are stepped or indexed to the next code word. When the end of the sequence is reached, both the transmitter and receiver start at the beginning again. This makes remote scanning of the system a waste of time as the unauthorized person will hardly be able to get the entire sequence. If the transmitter is actuated and the receiver does not pick up the signal, so that the transmitter has indexed to the next code word but the receiver has not, synchronism can be restored as described in U.S. Pat No. 4,686,529 with the use of auxiliary code words. This system is excellent, but very complex and expensive. Furthermore the steps that must be taken to restore synchronism after it is lost are fairly complex and not, therefore, suitable for a person in a hurry who, for instance, wants to open up his or her car in the rain after his or her child has been playing with the transmitter key.

In copending patent application 08/098,481 filed 28 Jul. 1993 the transmitter and receiver have respective independent clocks that step the respective code-holding registers through their identical series of code words synchronously. Thus at any particular instant the transmitter is set to send out a particular code word and the independently synchronized receiver is set to respond to this and only this same word. If there is some loss of synchronization, for instance caused by drift in one of the timers, the system is set up to automatically restore synchronization so long as the code word mismatch is not too radical, that is so long as the transmitted code word corresponds to a code word reasonably close in the series to the correct one. Further procedures are provided that allow resynchronization by actual physical juxtaposition of the transmitter and receiver.

Another security enhancement is described in U.S. Pat. No. 4,837,567 issued 6 Jun. 1989 which has a key including a transmitter for emitting a coded signal and formed with a laterally open recess, a receiver for the signal and connected to a latch of the vehicle for unlocking a door secured by the latch only when the coded signal is received, and a housing secured to the vehicle's steering column. A column bolt is displaceable in the housing between a locking position preventing relative rotation between the column and the housing and a freeing position out of engagement with the column and with the column freely rotatable in the housing. A barrel rotatable in the housing between end positions is formed with an axially open pocket generally complementary to the key and with a radially open latching recess. A switch is actuatable in one end position of the barrel for starting the vehicle and a locking pin is radially displaceable in the barrel and engageable into the pocket and into the recess of the key when same is fitted in the pocket. A lever has one arm engageable in the recess of the barrel in the other of the end positions and another arm engageable in this other end position with the pin to push same into the pocket and into the recess of the key therein. A spring urges the lever into a normal position with the one arm engaged in the recess and the other arm pulled away from the pin, so that, in the normal position of the lever and the other end position of the barrel, the barrel cannot rotate in the housing and the key can be moved axially out of the pocket. A solenoid is connected to the lever and energizable in the other end position of the barrel for pulling the lever out of the normal position and thereby pulling the one arm out of the barrel recess and pushing the other arm against the pin to push same in turn into the key recess. Thus when the solenoid is energized the barrel and key can turn in the housing but the key cannot be withdrawn axially from the barrel. Another receiver and a decoder are connected to the solenoid for receiving the signal from the key in the pocket and for energizing the solenoid only on receiving the signal.

Such an arrangement therefore combines the functions of a mechanical key with a radio-type transmitter, synergistically increasing security. Nonetheless such an arrangement has the disadvantage that, if the battery in the transmitter in the key goes dead, the user is locked out. Typically the mechanical key must then be used to actuate the lock system, which mechanical actuation constitutes the weak link in the security chain, as a would-be thief who can pick or otherwise circumvent the mechanical lock will be able to enter and operate the vehicle. Albeit another such mechanical lock is provided on the steering column to lock it, but such locks are normally not a significant problem for a skilled thief.

OBJECTS OF THE INVENTION

It is therefore an object of the present invention to provide an improved remotely operable lock system for a motor vehicle.

Another object is the provision of such an improved remotely operable lock system for a motor vehicle which overcomes the above-given disadvantages, that is which retains a high level of security even if the remote transmitter is dead, for instance because its battery is exhausted.

SUMMARY OF THE INVENTION

A motor-vehicle lock system has according to the invention a remote operator separate from the motor vehicle and having a key part having a predetermined bitting, a transmitter actuatable to transmit a main signal containing a main code word, and a transponder substantially independent of the transmitter for receiving an interrogation signal and thereupon generating a callback signal containing a callback code word. A lock provided with a switch is actuatable mechanically by the key part with the predetermined bitting to operate the switch. A central controller in the vehicle is connected to elements of the vehicle for actuating same. A receiver in the motor vehicle connected to the controller receives the main signal including the main code word, extracts the main code word from the transmitted main signal, compares the extracted main code word with a predetermined main code word, and sends a release signal to the controller when the extracted main code word corresponds to the predetermined main code word to actuate the elements. A transceiver in the motor vehicle is connected to the controller for, when the switch is actuated, generating the interrogation signal, receiving the callback signal containing the callback code word, extracting the callback code word from the callback signal, comparing the extracted callback code word with a predetermined callback code word, and sending a release signal to the controller when the extracted callback code word corresponds to the predetermined callback code word to actuate the elements and set in the transponder a new callback code word based on the main code word.

Thus with this system if the transmitter fails or gets desynchronized from the receiver, the operator is inserted into the lock like a key and its transponder is interrogated. The mechanical bitting, which can be standard up-and-down key bits or transparent regions on the key, serves merely to enable generation of the interrogation signal which in turn is tested by the transponder so that it responds with the appropriate callback signal only when the correct interrogation signal is received. Only when the transceiver receives the correct callback signal can the release signal be sent to the controller to operate some element of the vehicle, normally the door latches and/or the ignition. The interrogation signal can be related to the changing main code word, that is include all or part of it or be related to it by some factor, for instance as a function of time passed since the last actuation.

The transmitter according to the invention is provided with a power source and the transponder is wholly passive and has an antenna by means of which it receives power from the transceiver only when in the lock. The transponder therefore will always be available to emit its callback signal which is stored in nonvolatile memory along with the interrogation signal it is waiting for to send out the callback signal. Typically the transponder has a plastic housing under whose surface is imbedded a coil serving as antenna and energy pickup, and the lock is similarly constructed so that it can transmit energy to and receive signals from the transponder. It is also within the scope of the invention to provide an actual plug-and-socket connection between the transponder on the key and the one lock to power the transponder and exchange signals between the transponder and the transceiver.

According to the invention the system includes door latches connected electrically but not mechanically to the lock. This provides a very high level of security since even if the lock is forced, it will not be able to electrically trigger the latches.

As described in copending application 08/098,481 the transmitter in accordance with this invention includes a code register capable of outputting a predetermined sequence of code words and steppable through the sequence to output the code words sequentially one at a time, a clock connected to the register for periodically stepping it through the code-word sequence, and output means for modulating a signal with the code word currently is outputted by the register and for transmitting the modulated signal as the main signal. The receiver similarly includes a code register like the transmitter code register, capable of outputting the predetermined sequence of code words, and steppable through the sequence to output the code words sequentially one at a time, a clock like the transmitter clock and connected to the receiver code register for periodically stepping it through the code-word sequence substantially synchronously with the transmitter clock and transmitter register, and input means connected to the receiver code register and to the controller for receiving and demodulating a transmitted main signal, extracting a main code word from the demodulated signal, comparing the extracted main code word with the code word currently is generated by the receiver code register, and generating a release signal and sending it to the controller when the extracted code word not only corresponds to a code word in the code-word sequence but also lies no more than a predetermined number of code words in the sequence away from the code word currently is outputted by the receiver code register. This system alone offers a high degree of security that is doubled by the second code system employed when the key/operator is actually inserted into the lock. Normally it must be inserted in the ignition lock to start the car, although insertion into the door lock is not necessary to open the vehicle.

The lock system further has according to the invention a random-number generator having an output and energizeable to produce a random number corresponding to one of the code words at its output, and an initializer for at least temporarily connecting the output of the random-number generator to both of the registers for resetting same to output the code word corresponding to the random number of the generator.

In addition connection means, such as a serial-port interface, is provided between the transmitter and transponder for feeding to the transponder an auxiliary code word associated with the current main code word in the transmitter. The auxiliary code word represents the current state of the clock of the transmitter. Thus the callback code word can be a function of how much time has passed since the last actuation of the transmitter, a piece of information that an unauthorized user could hardly obtain.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
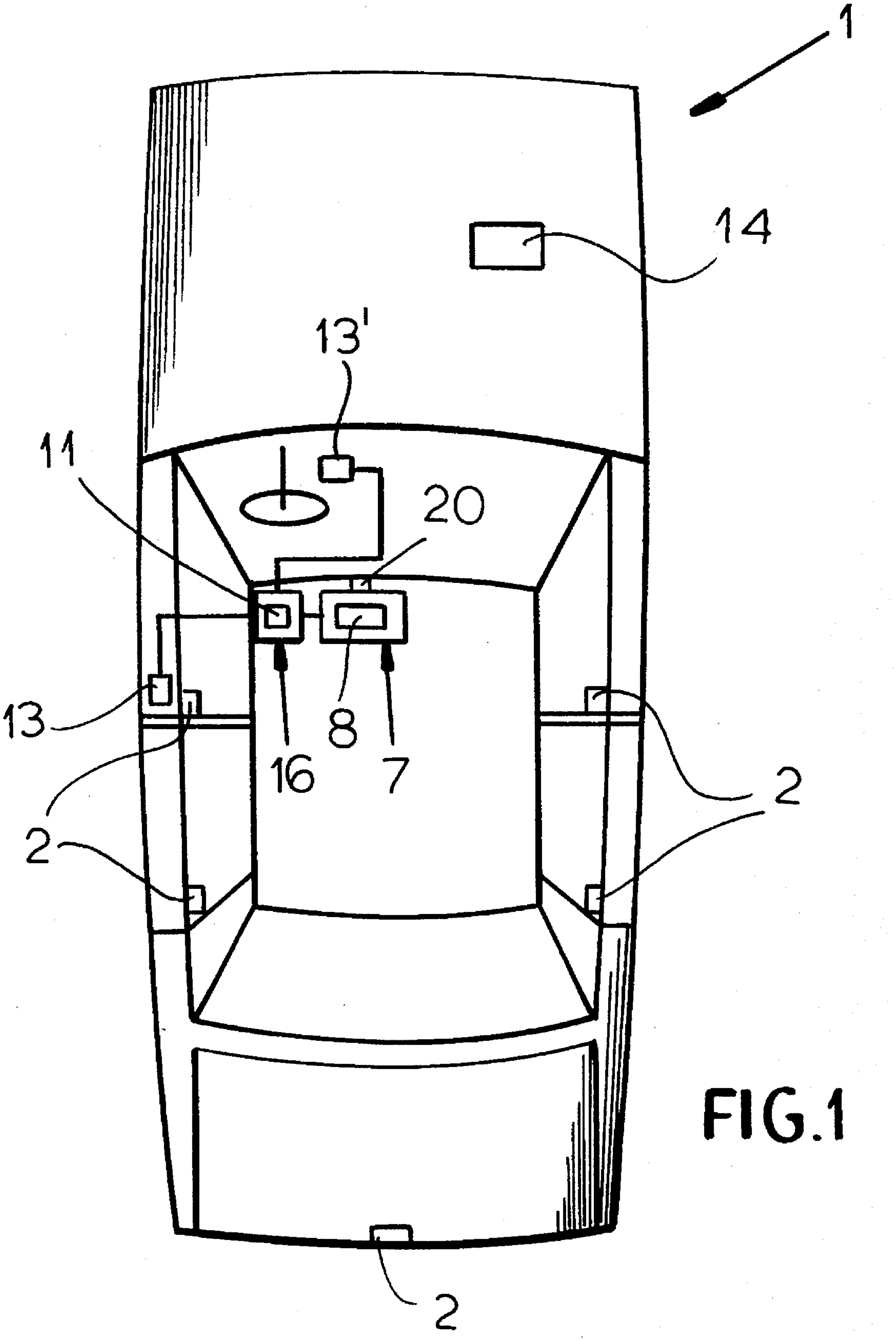
FIG. 1 is a schematic top view of a motor vehicle and central lock system according to the invention.

As seen in FIG. 1 a motor vehicle 1 is equipped with five door latches 2, one on each door and one on the trunk lid. They are all controlled by a central lock controller 14 which in turn can be operated by a driver-side front door lock 13 or by a receiver 7 mounted inside the vehicle and having a decoder 8 and an infrared pickup 20.

Figure 2:
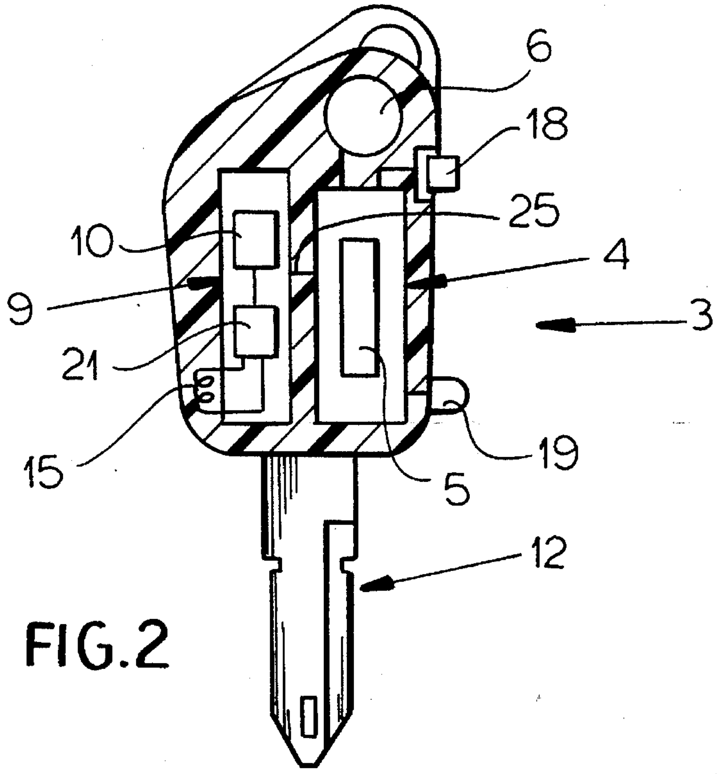
FIG. 2 is a largely schematic sectional view through the key/transmitter of the invention.

A remote operator 3 shown in FIG. 2 can operate this lock 13 and an ignition lock 13' manually and can operate the controller 14 by an infrared link. It has a power source 6, typically a small battery, that can operate a transmitter 4 including an encoder 5 to emit a coded infrared signal via a diode 19 when a switch button 18 is actuated. A passive transponder 9, that is one without its own power source and not connected to the battery 6, is provided in the operator 3 also with a code-word register 10 and a modem 21 that is connected to an antenna or pickup coil 15 imbedded in the plastic body of the operator 3. A standard bitted key blade 12 extends from the operator 3.

Figure 3:
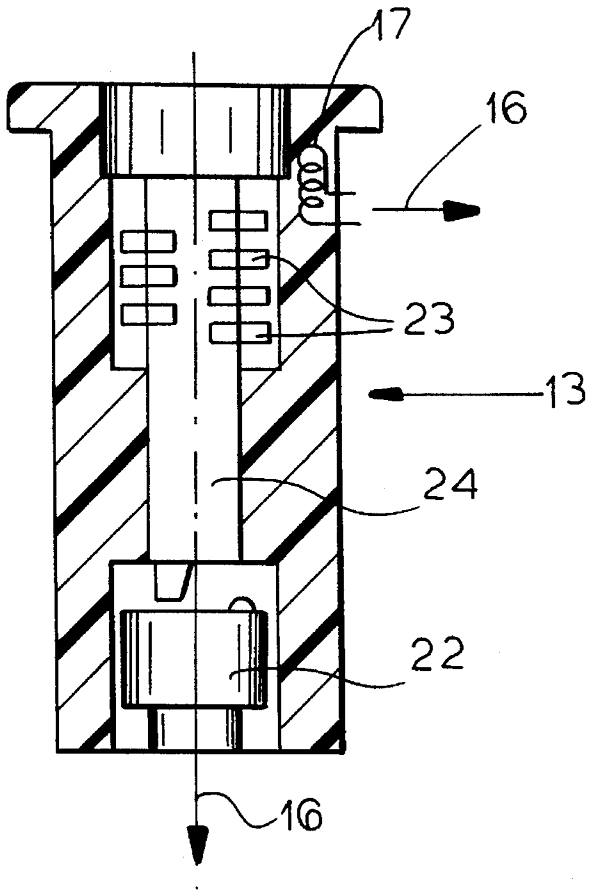
FIG. 3 is a largely schematic sectional view through part of a door lock according to the invention.

The vehicle 1 is provided with the receiver 7 that is intended to work with the transmitter 4 in the manner described in above-cited copending patent application 08/098,481. In addition it has a transceiver 16 with a code-word register 11 that can coact with the transponder 9 via a coil 17 provided in the locks 13 and 13' as shown in FIG. 3. The locks 13 and 13' each have tumblers 23 that coact mechanically with the bitted key blade 12 and a switch 22 that is actuated when the appropriately bitted key is inserted in the lock 13 or 13' and rotated. These switches 22 in turn operate the transceiver 16.

Figure 4:
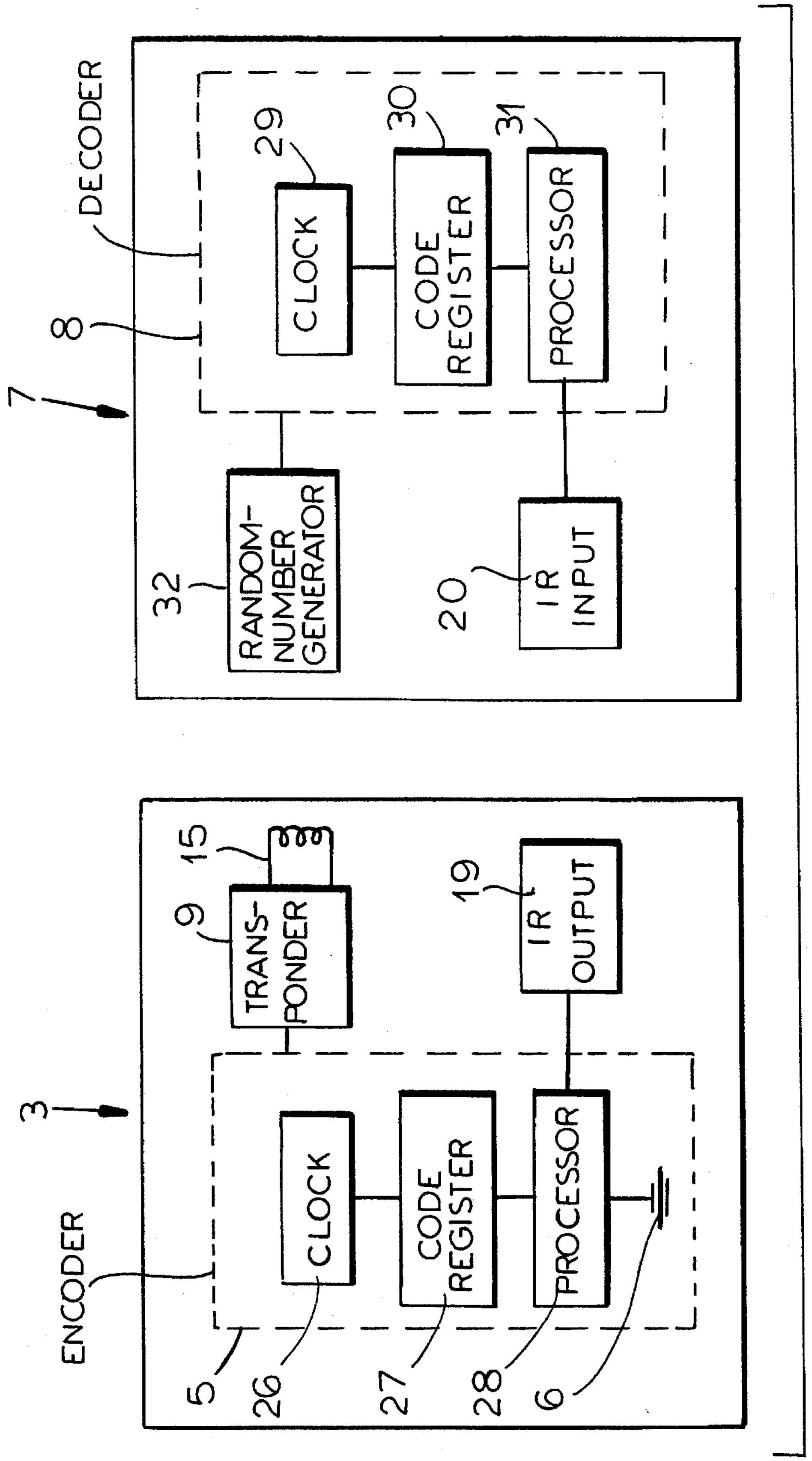
FIG. 4 is a schematic view of elements of the system.

As seen in FIG. 4 the encoder 5 includes a clock 26 connected to a code register 27 and thence to a processor 28 that feeds a modulated signal to the IR output formed by the photodiode 19. The receiver 7 has a clock 29 connected to a code register 30 and thence to a processor 31 connected to the photocell input 20. A random-number generator 32 is provided to initialize the system.

The system described above operates as follows:

Under normal circumstances all that one need to do to open the latches 2 is push the button 18 so as to emit from the diode 19 an infrared signal modulated with a predetermined code word. The signal is picked up by the detector 20 and compared in the receiver 7 with the code word in its register 30 and, if the transmitted code word is the same as the one in this register 30 a release signal is sent to the controller 14 which unlocks the latches. To increase security the systems normally operate as described in the patent application cited immediately above, that is both the encoder 5 of the operator 3 and the register 8 of the receiver 7 are periodically stepped by their respective synchronized clocks 26 and 29 through identical sequences of code words so that, while the word is constantly changing in both the transmitter 4 and receiver 7, they are both the same. Even if the transmitted code word does not exactly agree with the one in the receiver register 8, so long as it is not too far from it in the sequence the appropriate release signal is sent by the receiver 7 to the controller 14.

When, however, synchronization is completely lost or the battery 6 has died, the user must insert the key blade 12 in one of the locks 13 or 13' and rotate it. So long as the blade 12 is appropriately bitted, the barrel 24 of the lock 13 or 13' will turn and the switch 22 will be operated to actuate the transceiver 16. It will send a predetermined code word via the coil 17 to the coil 15, which also serves as a pickup for electrical energy, and the modem 21 will pass it to the code-word register 10. If the code-word signal from the transceiver 7 agrees with the code word in the transponder's register, the transponder 9 will respond and emit another code word that will be picked up by the transceiver 7 and compared to what is in its register 11. If this agrees with the set code word in the register 11, a release signal is sent to the controller 14 to open the latches 2.

Immediately thereafter the current code word is fed by the receiver 7 to the transponder transceiver 16 and stored in this register 11. The transceiver 16 sends this current code word to the transponder where it is stored in its register 10. The vehicle 1 can then be started by inserting the key 12 into the ignition switch 13' where it will operate as above but with the newly set code word so as to once again reset the code word in the registers 10 and 11.

In other words under normal circumstances the user need merely push the button 18 to get into his vehicle, whereupon the operator 3 is used like a standard key to start the vehicle. If, however, the remote link becomes inoperative, the mechanical key part 12 is used to initiate another type of electrically coded operation to open and/or start the vehicle. Thus even if an unauthorized person gains access to the operator 3 and duplicates the key blade 12, he or she will not be able to get through the higher level of electronic security.

According to the invention the code word used by the transponder 10 is in some way dependent on the code word from the register 8 and is reset each time the transponder 9 is used. In this manner it becomes virtually impossible to get around the double layer of coded electronic security.

The key operator 3 can also have a small serial interface or connection 25 between the transponder 9 and the transmitter 4. It allows one or more additional code words to be loaded into the transponder register 10 which can in turn be checked by the transceiver 16 and compared with additional code words in the transceiver register 11. Preferably the additional code word is one which shows that actual current position of the register of the encoder 5. If synchronization is lost, the serial connection can be used to reset the encoder 5 via the transponder 9 and to allow the transceiver 16 to check on the condition of the transmitter 4. Furthermore the system can be set up so that the engine of the vehicle can only be started after the doors have been unlocked properly.

We claim:

1. A motor-vehicle lock system comprising:

a remote operator separate from the motor vehicle and having
- a key part having a predetermined bitting,
- transmitter means actuatable to transmit a main signal containing a changing main code word, and
- transponder means substantially independent of the transmitter means for receiving an interrogation signal and thereupon generating a callback signal containing a callback code word;

a lock provided with a switch and actuatable mechanically by the key part with the predetermined bitting to operate the switch;

a central controller in the vehicle connected to elements of the vehicle for actuating same;

receiver means in the motor vehicle connected to the controller for
- receiving the main signal including the main code word,
- extracting the main code word from the transmitted main signal,
- comparing the extracted main code word with a predetermined main code word, and
- sending a release signal to the controller when the extracted main code word corresponds to the predetermined main code word to actuate the elements; and transceiver means in the motor vehicle and connected to the controller for, when the switch is actuated, generating the interrogation signal, receiving the callback signal containing the callback code word, extracting the callback code word from the callback signal, comparing the extracted callback code word with a predetermined callback code word, and sending a release signal to the controller when the extracted callback code word corresponds to the predetermined callback code word to actuate the elements and setting in the transponder a new callback code word based on the main code word.

2. The motor-vehicle lock system defined in claim 1 wherein the transmitter is provided with a power source and the transponder is wholly passive and has an antenna by means of which it receives power from the transceiver only when in the lock.

3. The motor-vehicle lock system defined in claim 2 wherein the system includes door latches connected electrically but not mechanically to the lock.

4. The motor-vehicle lock system defined in claim 1 wherein the transmitter means includes a code register capable of outputting a predetermined sequence of code words and steppable through the sequence to output the code words sequentially one at a time, a clock connected to the register for periodically stepping it through the code-word sequence, and output means for modulating a signal with the code word currently being outputted by the register and for transmitting the modulated signal as the main signal;

the receiver means including a code register like the transmitter code register, capable of outputting the predetermined sequence of code words, and steppable through the sequence to output the code words sequentially one at a time, a clock like the transmitter clock and connected to the receiver code register for periodically stepping it through the code-word sequence substantially synchronously with the transmitter clock and transmitter register, and input means connected to the receiver code register and to the controller for receiving and demodulating a transmitted main signal, extracting a main code word from the demodulated signal, comparing the extracted main code word with the code word currently being generated by the receiver code register, and generating a release signal and sending it to the controller when the extracted code word not only corresponds to a code word in the code-word sequence but also lies no more than a predetermined number of code words in the sequence away from the code word currently being outputted by the receiver code register.

5. The motor-vehicle lock system defined in claim 4, further comprising a random-number generator having an output and energizeable to produce a random number corresponding to one of the code words at its output; and initializing means for at least temporarily connecting the output of the random-number generator to both of the registers for resetting same to output the code word corresponding to the random number of the generator.

6. The motor-vehicle lock system defined in claim 5 further comprising connection means between the transmitter means and transponder means for feeding to the transponder means an auxiliary code word associated with the current main code word in the transmitter means.

7. The motor-vehicle lock system defined in claim 6 wherein the auxiliary code word represents the current state of the clock of the transmitter means.

* * * * *